(No Model.)
F. D. MOSES.
MANUFACTURE OF INFLAMMABLE AERIFORM SUBSTANCES FOR ILLUMINATING OR HEATING.
No. 507,663. Patented Oct. 31, 1893.
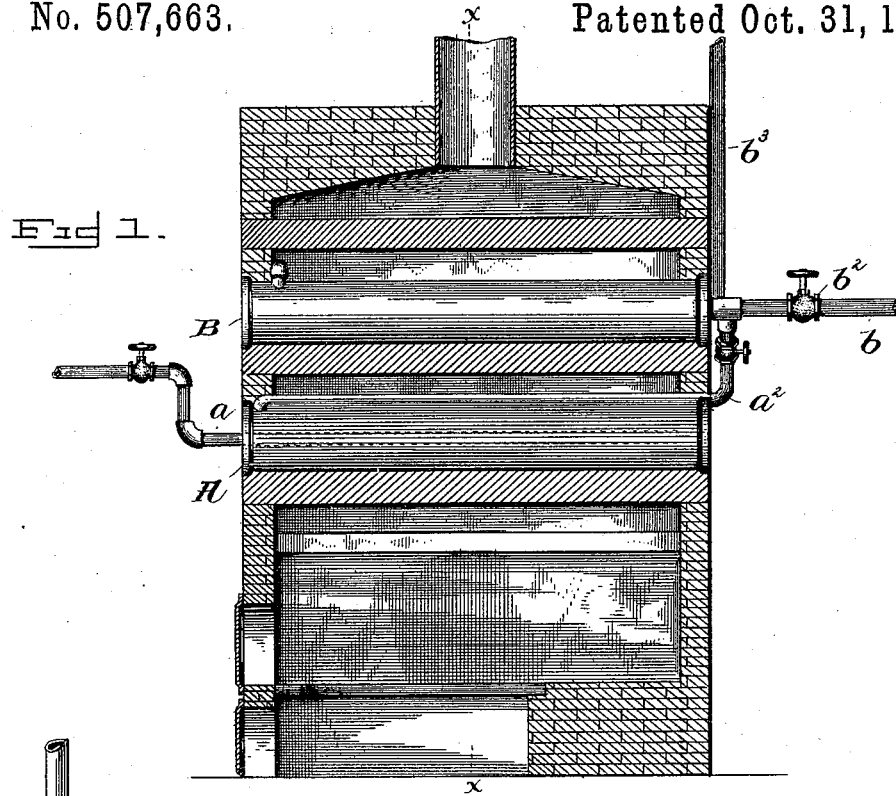
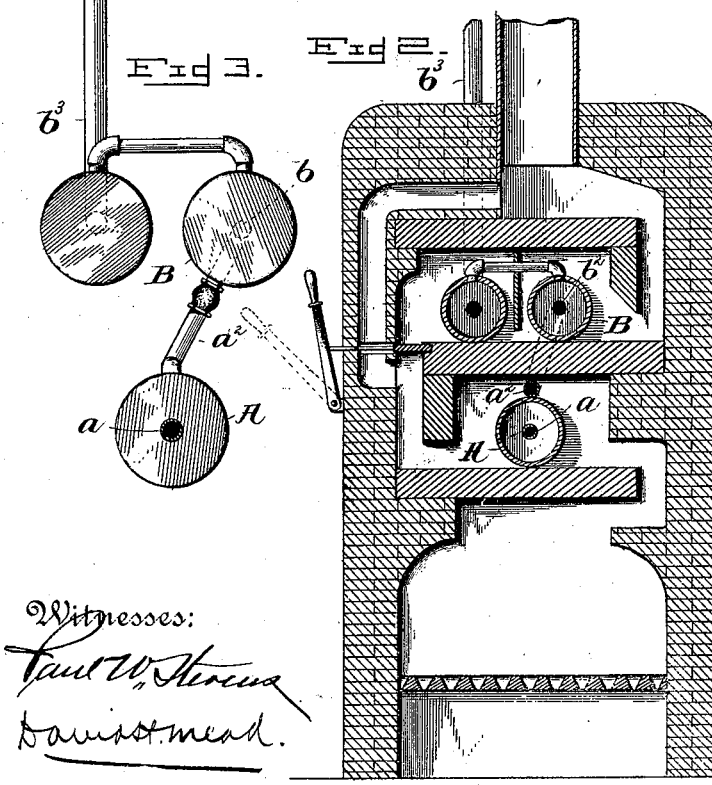
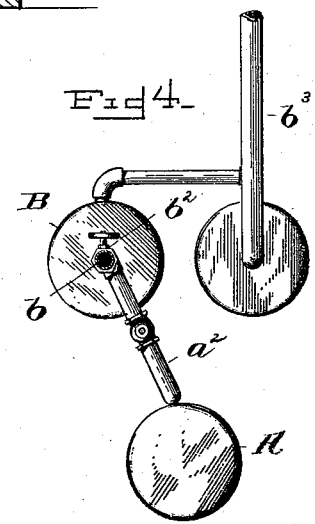
Witnesses:
Paul W. Stevens
Davis H. Mead
Inventor:
Frank D. Moses,
by R. S. Dyrenforth,
his Attorney.

UNITED STATES PATENT OFFICE.

FRANK D. MOSES, OF CHICAGO, ILLINOIS, ASSIGNOR TO THE UNIVERSAL GAS CONSTRUCTION COMPANY, OF MINNEAPOLIS, MINNESOTA.

MANUFACTURE OF INFLAMMABLE AERIFORM SUBSTANCES FOR ILLUMINATING OR HEATING.

SPECIFICATION forming part of Letters Patent No. 507,663, dated October 31, 1893.

Original application filed February 13, 1892, Serial No. 421,406. Divided and this application filed June 30, 1892. Serial No. 438,633. (No specimens.)

*To all whom it may concern:*

Be it known that I, FRANK D. MOSES, a citizen of the United States, residing at Chicago, in the county of Cook and State of Illinois, have invented certain new and useful Improvements in the Manufacture of Inflammable Aeriform Substances for Illuminating or Heating; and I do hereby declare the following to be a full, clear, and exact description of the invention, such as will enable others skilled in the art to which it appertains to make and use the same.

This invention relates to the manufacture of illuminating or fuel-gas.

The object of the invention is, in an inexpensive, and a ready and efficient manner, to produce an inflammable aeriform substance, of any desired candle-power or degree of dilution, the product to be a mixture of hydro-carbon with air as a diluent, so intimate, that stratification or separation will not subsequently occur.

With this object in view, the invention resides broadly in a process of manufacturing an inflammable aeriform substance, which consists in first vaporizing any desirable hydro-carboneceous matter at a suitable heat, and then mixing atmospheric air with the resulting vaporous product under heat, but at a temperature below that of ignition of the mixture, or of injurious decomposition of the vaporous hydro-carbon, whereby thorough commingling and admixture of the vaporous product and the air will ensue from the heat, the expansion of the air, and the mechanical motion of both ingredients, resulting in probable solution of the vaporous product in the air, or chemical union therewith.

In the accompanying drawings, forming part of this specification, and in which like letters of reference indicate corresponding parts, I have illustrated a form of apparatus capable of carrying my process into effect, although any other suitable form of apparatus may be employed; and in these drawings—

Figure 1—is a view in vertical, longitudinal section, with parts in elevation, showing an arrangement of retorts in a furnace, and conduits to and from them. Fig. 2—is a view, in transverse section, taken on the line $x$—$x$ of Fig. 1 and looking toward the right, showing details of apparatus. Figs. 3 and 4 are detail views of opposite ends of the retorts and connections, detached from the furnace; the first being a view from the left-hand end of Fig. 1, and the second a view from the right hand end thereof.

It has been observed that if hydro-carbon in the form of vapor is diluted with air under ordinary methods of admixture, the hydro-carbon will separate from the air and even tend to condense to liquid.

While I had succeeded in making a mixture of hydro-carbon vapor and air which, when inflamed, under a suitable pressure, through a proper orifice, gave a very brilliant light, by mixing cold atmospheric air with cold hydro-carbon vapor;—by mixing cold atmospheric air with hot hydro-carbon vapor;—by mixing hot atmospheric air with cold hydro-carbon vapor;—and, finally, by mixing hot atmospheric air with hot hydro-carbon vapor,—yet I found that, in practice, however carefully and thoroughly the mixture might have been made, under these conditions, there would still be more or less condensation at the burners, with consequent danger of fire in the buildings in which they were located. I finally ascertained that probably the only way to get a mixture of hydro-carbon vapor and air, which will be permanent, is to lead these substances, together, into a closed vessel, and there to heat them simultaneously, and under such conditions, that is to say, to a sufficiently high degree of temperature without danger of explosion from ignition, (as from incandescent surfaces of the containing vessel,) and for a proper time, (as by delay or passage in a long retort,)—that there may be a thorough commingling of the ingredients, by the mechanical action of heat as well, perhaps, as a fixation by the heat itself.

The point of this invention is to effect such a thorough and intimate admixture of air, in any desired quantity, with the vaporous hydro-carbon, that the mixture will be more permanent; and I have ascertained that by mixing vaporous hydro-carbon with air, while the hydro-carbon and the air are subjected simultaneously to heat, this result is attained.

It is believed, that by heating vaporous hydro-carbon and air together, not only does the the air so expand as to allow proper arrangement of the molecules of the hydro-carbon in its body as a vehicle; but the heat, besides exerting a dissolving action, causes such mechanical motion of the air and the hydro-carbon, that is, of the ingredients of the mixture, among themselves, that a most intimate composition results. But in mixing the hydro-carbon with air, the precaution must be observed not to allow the heat of the containing vessel to be raised high enough, either to allow the hydro-carbon to become ignited and undergo combustion, from the presence of oxygen in the air, or to be injuriously decomposed with deposit of carbon, that is, broken up. The temperature of any suitable containing vessel at which vaporous hydro-carbon, in the presence of oxygen, would become ignited, or at which it would be decomposed, is known to science or those skilled in the art, so that it is not necessary to specify the same. Suffice it to say that the temperature applied at the admixture is considerably below that of incandescence of the containing vessel.

In carrying out the invention to make an inflammable aeriform substance, the hydro-carbonaceous substance is vaporized without additional fixing, and then the vaporous product is intimately associated with air, during the application of heat to the mixture.

The apparatus, shown, is to be employed as follows: Suitable hydro-carbonaceous matter, such as petroleum, rosin, rosin-oil, pitch, or suitable tar, is first supplied to the retort A by a feed-pipe or conduit $a$, and the retort is so located in the furnace as to be subjected to a heat sufficiently high to vaporize the hydro-carbonaceous substance, and, perhaps, effect some fixing of the vapor, without causing decomposition or a deposit of carbon within the retort; the arrangement of the feed-pipe extending toward the farther end of the retort with exit from the retort at the other end aiding the desirable operation. The product is led directly from the retort A by a pipe or conduit $a^2$ to the retort B (which is here shown as a double retort), located farther from the fire than the retort A. It will be seen that the retort is in a situation to be strongly heated; but from its position, it will not be heated too highly, and the heat may be regulated by flue and damper, as shown. Atmospheric air, under pressure, is admitted to this retort by a pipe or conduit $b$, and the supply will be regulated by a valve $b^2$. A thorough association of the vaporous hydro-carbon with the air will be effected in the retort B, and the product will pass up the stand-pipe $b^3$ and may be led elsewhere for use. It will be clear that the candle-power of the resulting inflammable aeriform substance will depend upon the quantity of air admitted, as regulated by the valve, or the degree of dilution, care being taken not to admit a quantity of air too great for the capacity of the retort, that is to say, to admit only so much air as can be adequately heated.

It will be observed that, in the present procedure, hydro-carbon, in liquid form, is vaporized, by itself, in the vaporizing retort, without the presence or admission of air, steam, or any extraneous fluid; whereby a pure and rich hydro-carbon gas is first made, by itself, and any danger of explosion in the vaporizing retort, as from the presence or admission of air, or cooling of this retort or variation of its temperature, as from the presence or admission of steam, is avoided; although, it is to be understood, that steam may subsequently be employed to free the retort from any carbon deposit. It will further be observed, that the mixture of hydro-carbon vapor with air is not effected during vaporization, nor in a mixing vessel, prior to re-heating; but that the hydro-carbon-vapor having been generated, by itself, it is conveyed to a heated mixing vessel or re-heater and there combined with air, by itself, the air being unassociated with anything else, and the hydro-carbon vapor being combined with the air under a defined heat applied simultaneously to both ingredients, whereby the air, having been cooled before entering the mixer, it opens out, so to speak, to receive the molecules of hydro-carbon and the application of heat to both ingredients simultaneously, causes the same sort of mechanical admixture as there might be from inconceivably-rapid churning together of the two ingredients, and this without decomposition of the hydro-carbon.

The invention is carefully to be distinguished from any mere carbureting process, wherein atmospheric air is blown over or through liquid hydro-carbon; also from any procedure in which air is blown into a retort in which gas is being generated from hydro-carbon; also from any procedure in which steam and hydro-carbon, or steam, air and hydro-carbon, are blown together into a hot retort; and, finally, from any process in which a rich vapor or gas is first made and subsequently diluted with air, cold or hot.

I make no claim in the present application to the process of manufacturing a gaseous product by first vaporizing any suitable hydro-carbonaceous matter, at a proper heat, then fixing the resulting vaporous product at a higher heat, and then mixing atmospheric air in suitable quantity with the resulting gas while both the air and the gas are subjected to a strong heat, since such forms the subject-matter of another application of mine,— one filed February 13, 1892, Serial No. 421,406, patented July 19, 1893, No. 479,293, of which the present application is a division, my assignment of that application, covering the present application also.

Having thus fully described my invention, what I claim as new, and desire to secure by Letters Patent, is—

The process of manufacturing an inflammable aeriform substance, which consists in first vaporizing any proper hydro-carbonaceous matter by itself at a suitable heat, and then mixing ordinary atmospheric air with the resulting vaporous product under heat applied to the mixture, and of a temperature below that of ignition of the mixture, or decomposition of the vaporous hydro-carbon, substantially as specified.

In testimony whereof I affix my signature in presence of two witnesses.

FRANK D. MOSES.

Witnesses:
   WILL. G. REYNOLDS,
   W. H. MURPHY.